(12) United States Patent
Bhogal et al.

(10) Patent No.: US 7,825,771 B2
(45) Date of Patent: *Nov. 2, 2010

(54) SYSTEM AND METHOD FOR MEASURING RFID SIGNAL STRENGTH WITHIN SHIELDED LOCATIONS

(75) Inventors: Kulvir S. Bhogal, Fort Worth, TX (US); Gregory J. Boss, American Fork, UT (US); Rick A. Hamilton, II, Charlottesville, VA (US); Alexandre Polozoff, Bloomington, IL (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 87 days.

This patent is subject to a terminal disclaimer.

(21) Appl. No.: 12/172,552

(22) Filed: Jul. 14, 2008

(65) Prior Publication Data

US 2009/0009333 A1 Jan. 8, 2009

Related U.S. Application Data

(63) Continuation of application No. 11/426,968, filed on Jun. 28, 2006, now Pat. No. 7,446,661.

(51) Int. Cl.
*H04Q 5/22* (2006.01)

(52) U.S. Cl. .................................. 340/10.1; 340/572.1

(58) Field of Classification Search .............. 340/572.1, 340/552, 10.1; 235/385; 324/600; 455/69.11, 455/67, 67.7, 67.12, 67.14
See application file for complete search history.

(56) References Cited

U.S. PATENT DOCUMENTS

| | | | |
|---|---|---|---|
| 3,877,002 A * | 4/1975 | Cheal et al. ................. 340/552 |
| 5,198,799 A * | 3/1993 | Pascale ...................... 340/552 |
| 6,577,238 B1 | 6/2003 | Whitesmith et al. |
| 6,711,423 B2 | 3/2004 | Colvin, Jr. |
| 6,784,789 B2 | 8/2004 | Eroglu et al. |
| 2003/0089771 A1* | 5/2003 | Cybulski et al. ............ 235/385 |
| 2004/0018437 A1* | 1/2004 | Hata ............................. 430/5 |
| 2005/0269407 A1* | 12/2005 | Harmon ..................... 235/435 |
| 2006/0261821 A1* | 11/2006 | Lee et al. .................... 324/600 |

* cited by examiner

*Primary Examiner*—Shirley Lu
(74) *Attorney, Agent, or Firm*—Yee & Associates, P.C.; William H. Steinberg; Rudolf O. Siegesmund (57) ABSTRACT

An RFID Probe comprises a pole with a plurality of sensors that indicate RF signal strength attached at regular intervals and marked to indicate distance from an end of the pole. A user employs the RFID Probe by placing the probe between densely packed materials, such as cases on a pallet, and exposing the RFID Probe and packaging to a signal from a RIFD transceiver. After exposing the RFID Probe to the RFID transceiver signal, the user removes the RFID Probe from the packed materials and observes the sensors on the probe. By noting the location on the probe of the sensors indicating low or no RF signal, the user can identify locations where RF signal strength is insufficient to activate an RFID tag.

10 Claims, 7 Drawing Sheets

SYSTEM AND METHOD FOR MEASURING RFID SIGNAL STRENGTH WITHIN SHIELDED LOCATIONS

CROSS-REFERENCE TO RELATED APPLICATION(S)

This application is a continuation application of U.S. utility patent application entitled "System and Method for Measuring RFID Signal Strength Within Shielded Locations" filed on Jun. 28, 2006, now U.S. Pat. No. 7,446,661 and accorded Ser. No. 11/426,968 and claims priority therefrom.

FIELD OF THE INVENTION

The invention relates generally to the field of electrical communications and specifically to querying an information containing device for an immediate reply.

BACKGROUND OF THE INVENTION

Radio Frequency Identification ("RFID") technology comprises two elements: a transponder (hereafter "tag"), which is generally a small, paper thin computer chip with an antenna which stores data, and a transceiver which utilizes a radio signal (hereafter "RF") in the approximate 800-930 Mhz UHF range to read the data from the tag. Active RFID tags contain a power source, such as a battery, and can actively transmit the tag's stored data. Passive RFID tags cannot transmit by themselves, and require a RFID transceiver to provide power via radio signals transmitted by the RFID transceiver. As passive RFID tags pass by an RFID transceiver, the transceiver powers the tag and reads the data stored on the tag.

Large retail companies such as WAL-MART® find passive RFID tags advantageous over optical barcodes for inventory tracking RFID tags have two distinct advantages over traditional optical barcodes: RFID tags can store more information, and RFID tags do not require line-of-sight readings.

A problem in the implementation of passive RFID technology for inventory tracking arises from dead spots. Dead spots can be caused by dense packing of passive RFID tags where inventory materials shield the tags and interrupt signal transmission. For example, in a pallet containing sixty cases of canned goods, where each case has a passive RFID tag, the metal cans around the periphery of the pallet shield the RFID transceiver's signal. Even if the RFID transceiver successfully reads fifty of the sixty RFID tags located on the pallet, the RFID technology failed as a tracking and inventory method because the RFID technology gathered incomplete and inaccurate information.

Dead spots can be avoided by placing passive RFID tags to avoid shielding problems. In addition, RFID repeaters, placed within the packed pallet, can ensure that the RFID transceiver's signal reads all of the passive RFID tags on the pallet. But in order to be sure that all of the passive RFID tags on the pallet are read, the placement of the passive RFID tags and RFID repeaters, if any, must be tested.

One known method for testing the placement of RFID tags uses heat-sensitive liquid crystals ("LCDs") that change color when exposed to certain radio frequencies. LCDs that are sensitive to the RF frequency transmitted by an RFID transceiver can act as markers, showing where the reach of the RFID signal. Furthermore, light emitting diodes ("LEDs") affixed to products or product packaging may be coupled with a radio frequency receiver to verify the scanning of passive RFID tags. Using these known methods, RFID tag locations may be tested by trial and error.

A need exists for a more efficient (non-trial and error) method to determine placement of passive RFID tags or RFID repeaters in densely packed product and product packaging storage unit to ensure RFID transceivers can read all the passive RFID tags in the storage unit.

SUMMARY OF THE INVENTION

An "RFID Probe" comprises a pole with a plurality of sensors attached at regular intervals. The sensors may be RF sensitive LCDs or LEDs. The sensors change color when exposed to an RF signal with strength sufficient to activate a passive RFID tag. In addition to the sensors, RFID Probe markers may indicate height or depth. A user employs the RFID Probe by placing the probe between densely packed materials such as cases on a pallet, and exposing the RFID Probe and the packaging to a signal from an RFID transceiver. After exposing the RFID Probe to the RFID transceiver signal, the user removes the RFID Probe from the packed materials and observes the sensors on the probe. By noting the location on the probe of the sensors with no color change, the user can identify locations where RFID tags should not be placed, or where RFID repeaters should be placed. After the user relocates RFID tags or places RFID repeaters, the RFID Probe may be reset and the process repeated to verify proper signal penetration.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

Figure 1:
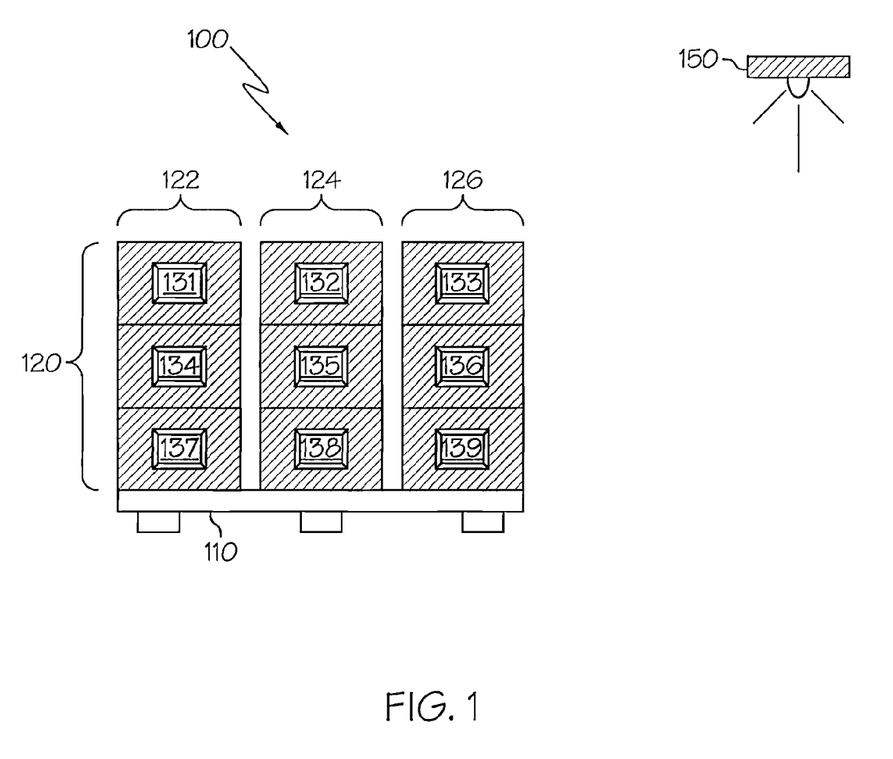
FIG. 1 is an exemplary pallet of goods with RFID tags and a RFID transceiver.

FIG. 1 shows a densely packed pallet of goods with RFID tags. Product pallet 100 comprises pallet 110 and a plurality of packages 120. Plurality of packages 120 are shown stacked in first package column 122, second package column 124, and third package column 126. Each of the plurality of packages 120 has an individual RFID tag 130 (labeled for convenience 131 to 139. RFID transceiver 150 locates at a position within transmission range of product pallet 100.

Figure 2A:
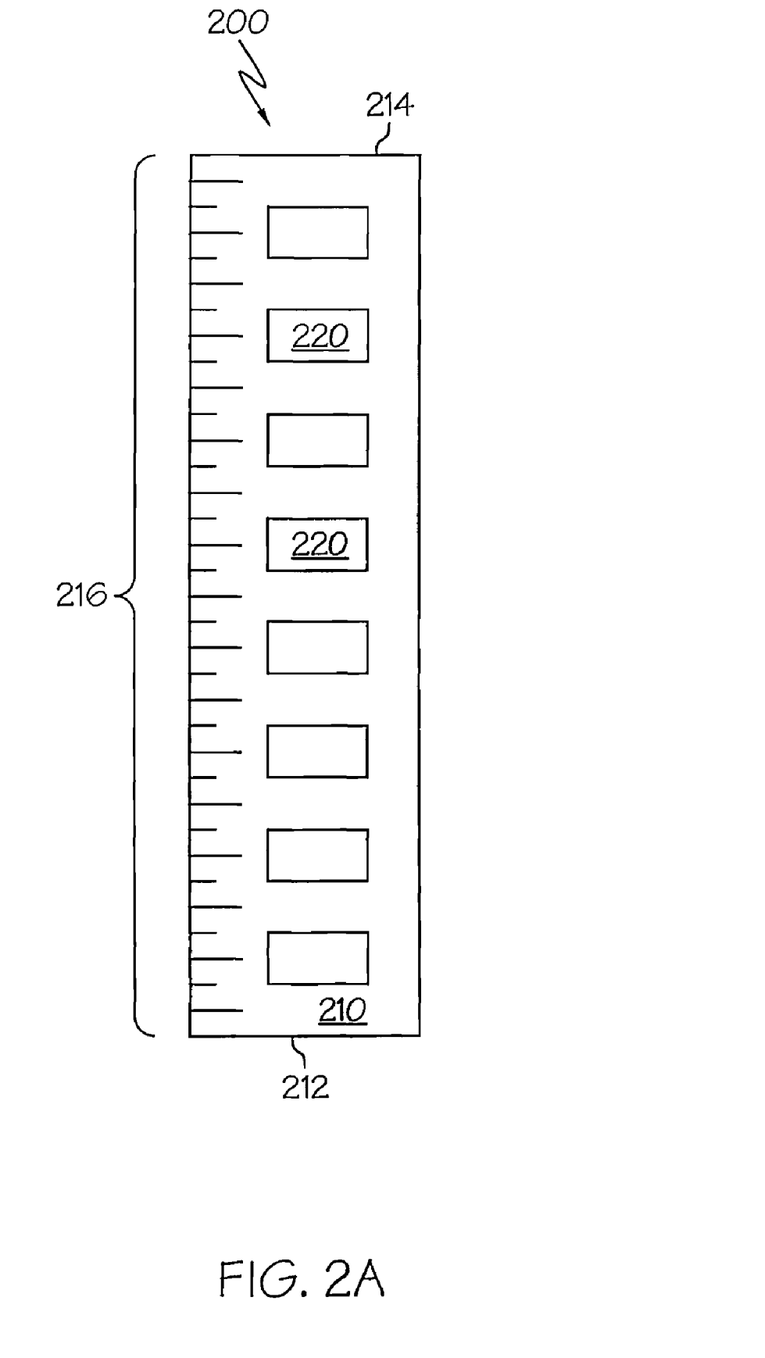
FIGS. 2a, 2b, and 2c are embodiments of an RFID Probe.

FIG. 2A shows RFID Probe 200 having a plurality of regularly spaced RF sensors 220 affixed to pole 210. As used herein, "pole" means any longitudinal member to which sensors 220 can be affixed. Pole 210 may be made of any sufficiently rigid material to support sensors 220. Pole 210 is adapted to fit between packages 120, to extend from pallet 110 to a point above the highest package of packages 120, and to securely affix sensors 220 to pole 210. RFID Probe 200 may also have markings 216 to indicate distance along pole 210 between first end 212 and second end 214. Markings 216 allow a user to determine a location for physical placement of RFID tags or repeaters after testing RF signal penetration with RFID Probe 200.

Figure 2B:
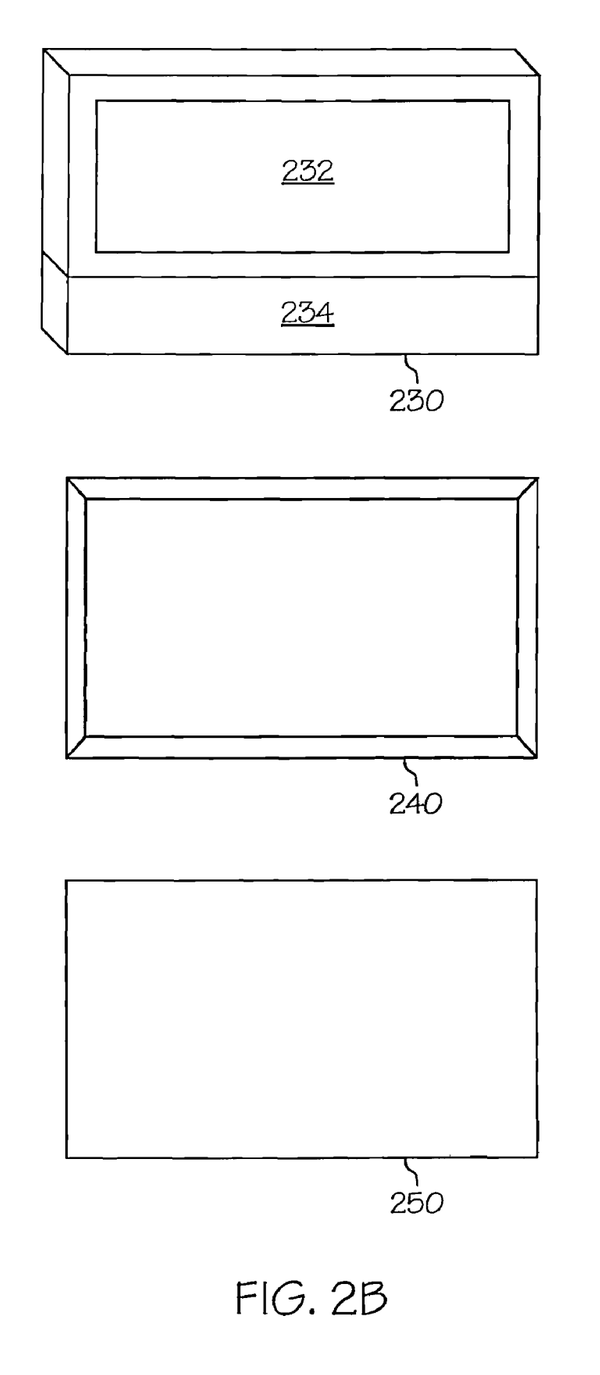

FIG. 2B shows multiple embodiments of Sensor 220. One embodiment of sensor 220 may be electronic display 230 comprising an electronic RFID receiver 232 coupled with a LED 234. Other embodiments of Sensor 220 may include an RF sensitive LCD 240, or a carbon coated ABS ("Acrylonitrile Butadiene Styrene") plastic 250. Persons skilled in the art will be aware of additional embodiments of sensor 220, but each embodiment of sensor 220 will provide an indication of exposure to a specified level of RF signal strength. In addition to indicating exposure to a specified level of RF signal strength, sensor 220 may be adapted to provide a different indicator for different ranges of RF signal strength. For example, using a color coded cue, sensor 220 may be red if there is no signal present, yellow when encountering low signal strength, and green when encountering signal strength sufficient to activate a passive RFID tag.

Figure 2C:
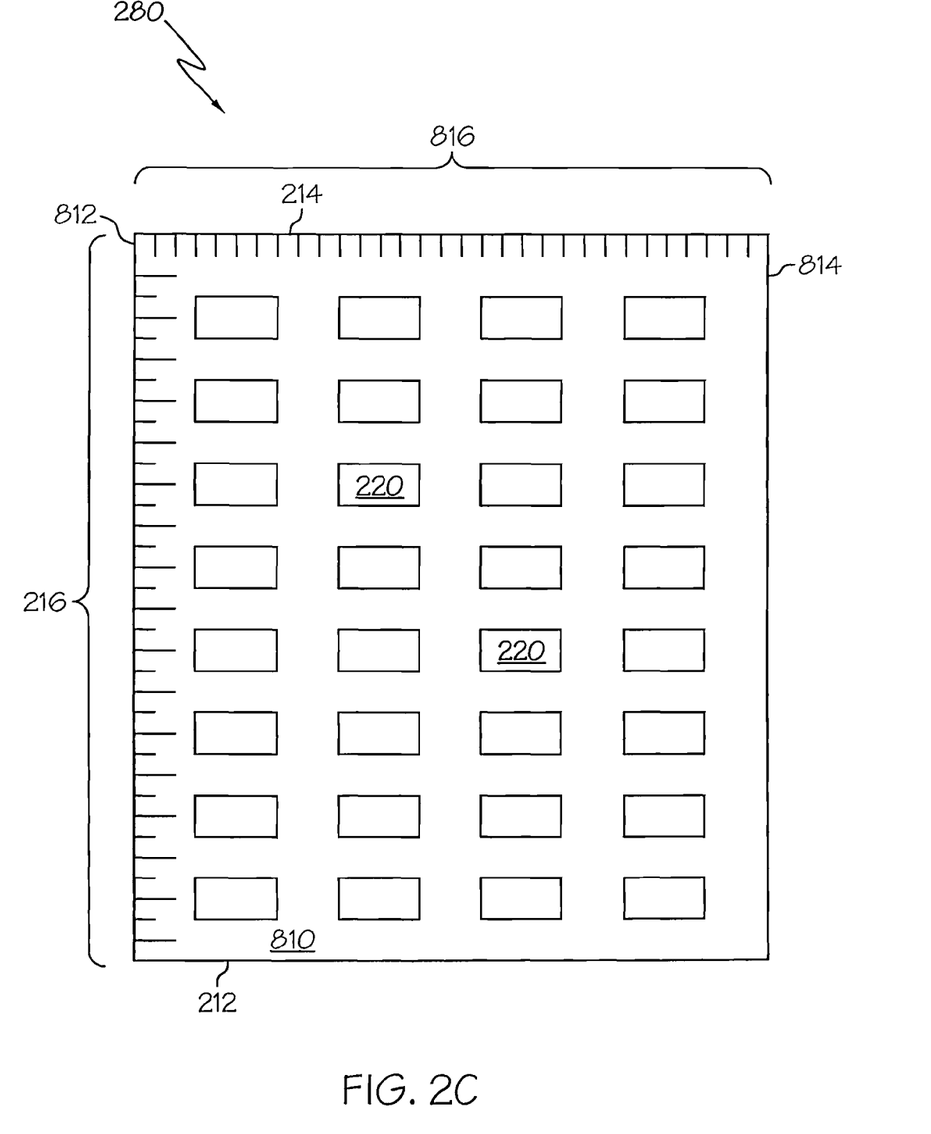
Figure 3A:
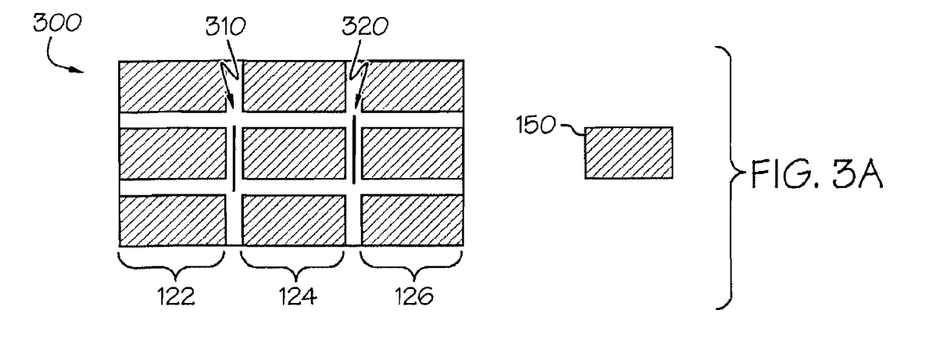
FIGS. 3a, 3b, 3c, and 3d show vertically oriented RFID Probes having sensors responsive to RF signal strength in a pallet of goods.
Figure 3B:
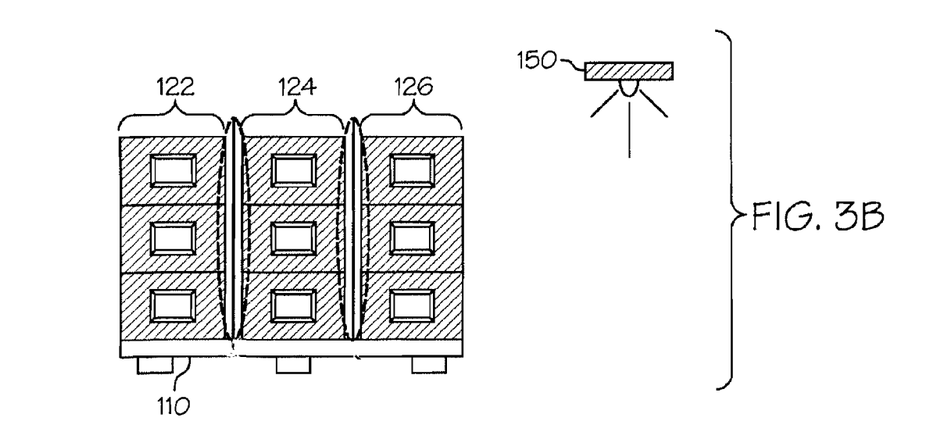
Figure 3C:
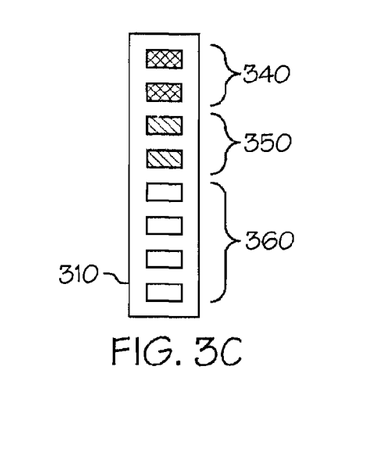
Figure 3D:
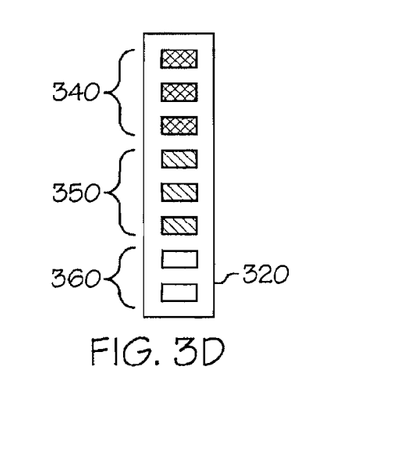

FIG. 2C depicts alternate RFID probe 280 having multiple columns of RF sensors 220 affixed to pole 810. In this embodiment, sensors 220 are arranged in an array to measure RF signal strength in both a horizontal and vertical orientation simultaneously. Alternate RFID Probe 280 may also have markings 216 to indicate distance along pole 810 between first end 212 and second end 214 and markings 816 to indicate distance across pole 810 between first side 812 and second side 814.

Referring to FIGS. 3a, 3b, 3c, and 3d, tested product pallet 300 has a first RFID Probe 310 inserted vertically between first package column 122 and second package column 124, and second RFID Probe 320 inserted vertically between second package column 124 and third package column 126. First RFID Probe 310 and second RFID Probe 320 extend from pallet 110 beyond a point above the top of first package column 122, second package column 124 and third package column 126. First RFID Probe 310 and second RFID Probe 320 show sensor readings from exposure to an RF signal from RFID transceiver 150. First exposed sensors 340 have recorded a sufficient intensity of RF signal to activate a passive RFID. Second exposed sensors 350 recorded an insufficient RF signal to activate a passive RFID, and third exposed sensors 360 did not record any RF signal exposure. Fewer sensors record a sufficient intensity of RF signal on first RFID Probe 310 than on second RFID Probe 320 because first RFID Probe 310 is located farther away from RFID transceiver 150 than second RIFD Probe 320.

Figure 4:
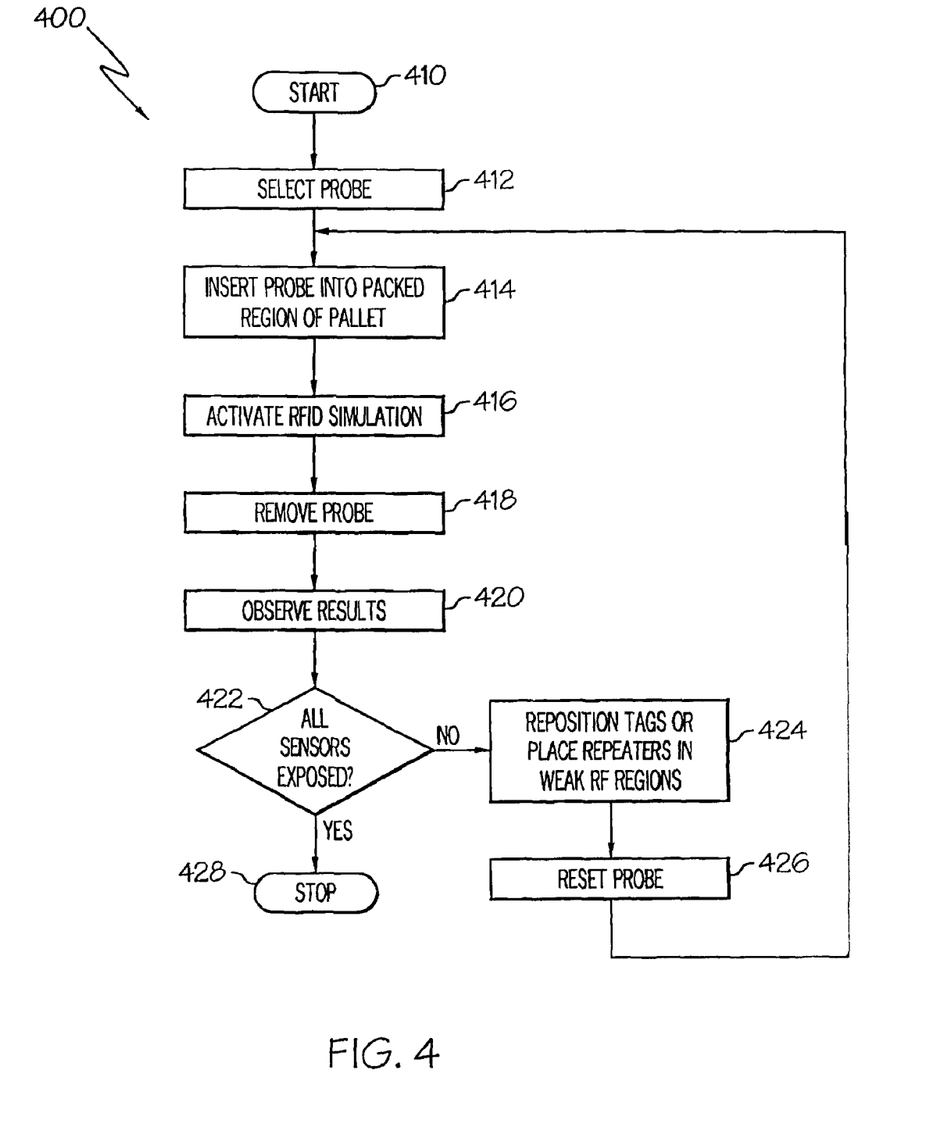
FIG. 4 is a flowchart of a method for using the RFID Probe.

A method of using an RFID Probe is shown by FIG. 4. A user starts (410) the RF signal test by selecting an appropriately sized RFID probe to measure the full depth or height of a pallet of goods (412). The user inserts at least one RFID Probe 200 into the pallet of goods (414) and activates an RFID simulation using an RFID transceiver or other suitable device for simulating an RFID signal transmission (416). Although the RF penetration testing can be conducted at the regular frequency used by passive RFID tags, it is common practice to perform testing at nearby frequencies to avoid actually activating the tags. The simulation uses a nearby frequency in an active commercial environment to prevent duplicate readings of the same materials which could cause inaccurate inventory or tracking of the goods. After exposing the RFID Probes to the RF transceiver signal, the user removes the RFID probes (418) and reads the sensors on each of the RFID Probes (420). If some of the sensors near RFID tags indicate dead zones with low or no RF signal (422), the user can re-position the passive RFID tags or add repeaters to amplify the RF signal in the dead zones (424). The user can reset the sensors on the RFID Probes (426) and repeat steps 414-422 until all sensors near RFID tags indicate sufficient exposure (422) and the test stops (428).

Figure 5A:
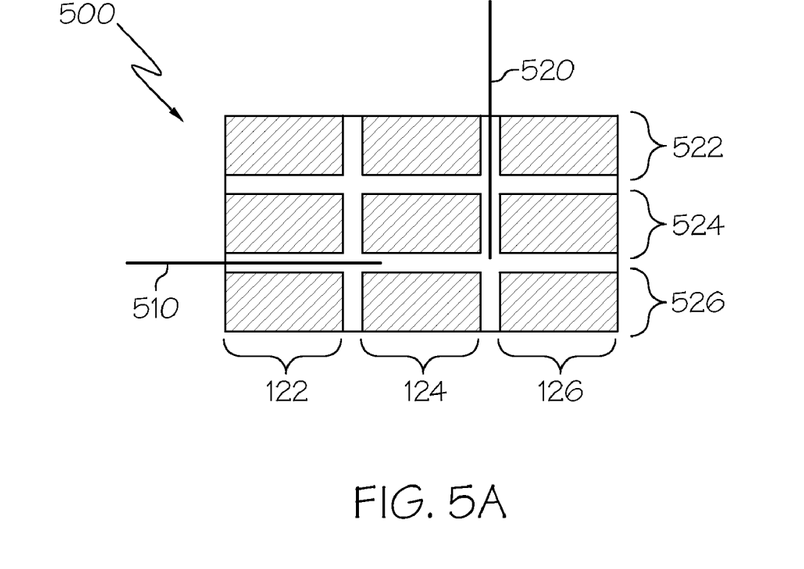
FIGS. 5a and 5b show horizontally oriented RFID Probes.
Figure 5B:
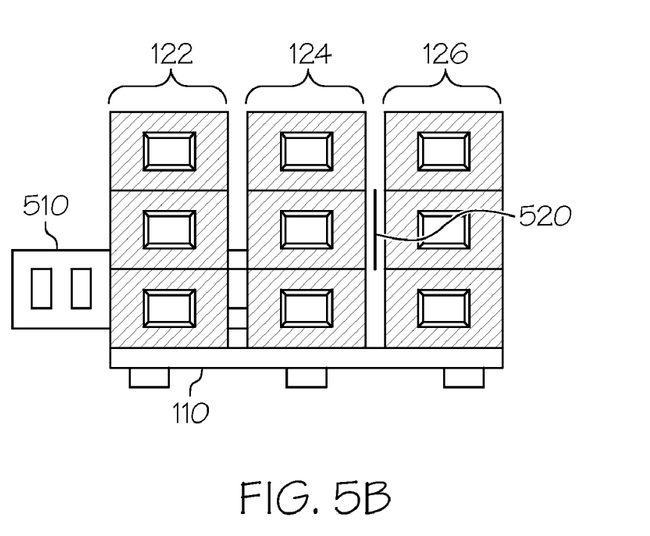

FIGS. 5a and 5B depict product pallet 500 with a plurality of packages shown stacked in first package column 122, second package column 124, and third package column 126. From the top view of FIG. 5a, the plurality of packages can also be describe as stacked in fourth package column 522, fifth package column 524, and sixth package column 526. FIGS. 5a and 5b depict product pallet 500 having a first RFID Probe 510 inserted horizontally between fifth package column 524 and sixth package column 526, and second RFID Probe 520 inserted horizontally between first package column 124 and second package column 126. When fully inserted, first RFID Probes 510 and second RFID 520 probe extend horizontally through product pallet 500.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A process for systematically identifying a dead spot for an RF signal in a package stack, the process comprising:
   inserting a probe into the package stack, the probe having a plurality of attached RF sensors adapted to provide an indication of an intensity of exposure to the RF signal;
   transmitting the RF signal from a RFID transceiver;
   responsive to transmitting the RF signal, reading the plurality of attached RF sensors to identify a location of the dead spot of the RF signal in the package stack; and
   calculating the location of the dead spot by one of measuring the distance from an end of the probe to a sensor of the plurality of attached RF sensors that indicates an intensity of exposure to the RF signal and measuring a distance between a first indicating sensor and a second indicating sensor, wherein the first indicating sensor and the second indicating sensor are sensors of the plurality of attached RF sensors that indicate an intensity of exposure to the RF signal.

2. The process of claim 1 further comprising the step of:
   placing an RF repeater to retransmit the RF signal to the dead spots.

3. The process of claim 1 wherein a plurality of passive RFID tags are affixed within the package stack.

4. The process of claim 3 further comprising the step of:
   repositioning a passive RFID tag located in a dead spot within the package stack to an area of the package stack where the passive RFID tag can receive the RF signal.

5. An apparatus comprising:
   a pole having a plurality of sensors spaced at regular intervals along the pole, the pole adapted for insertion into a package stack, wherein the sensors provide an indication of an intensity of exposure to an RF signal inside the package stack and to calculate the location of a dead spot by one of measuring the distance from an end of the probe to a sensor of the plurality of attached RF sensors that indicates an intensity of exposure to the RF signal and measuring a distance between a first indicating sensor and a second indicating sensor, wherein the first indicating sensor and the second indicating sensor are sensors of the plurality of attached RF sensors that indicate an intensity of exposure to the RF signal.

6. The apparatus of claim 5 wherein each of the plurality of sensors comprise an electronic display.

7. The apparatus of claim 6 wherein the electronic display further comprises a RFID receiver coupled to a LED.

8. The apparatus of claim 5 wherein each of the plurality of sensors comprises a RF sensitive LCD.

9. The apparatus of claim 5 wherein each of the plurality of sensors comprises a carbon coated acrylonitrile butadiene styrene plastic.

10. A system comprising:
a pole having a plurality of sensors spaced at regular intervals along the pole, the pole adapted for insertion into a package stack, wherein the sensors provide an indication of an intensity of exposure to an RF signal inside the package stack and wherein each of the sensors comprise a RFID receiver coupled to a LED and to calculate the location of a dead spot by one of measuring the distance from an end of the probe to a sensor of the plurality of attached RF sensors that indicates an intensity of exposure to the RF signal and measuring a distance between a first indicating sensor and a second indicating sensor, wherein the first indicating sensor and the second indicating sensor are sensors of the plurality of attached RF sensors that indicate an intensity of exposure to the RF signal.

* * * * *